Sept. 9, 1924.

F. J. PLYM 1,507,623

WINDSHIELD FOR AUTOMOBILES

Filed March 17, 1917

Inventor
Francis J. Plym
per Wallace R. Lane
Attorney

Patented Sept. 9, 1924.

1,507,623

UNITED STATES PATENT OFFICE.

FRANCIS J. PLYM, OF NILES, MICHIGAN.

WINDSHIELD FOR AUTOMOBILES.

Application filed March 17, 1917. Serial No. 155,421.

*To all whom it may concern:*

Be it known that I, FRANCIS J. PLYM, a citizen of the United States, residing at Niles, in the county of Berrien, State of Michigan, have invented new and useful Improvements in Windshields for Automobiles, of which the following is a specification.

This invention relates to new and useful improvements in casings peculiarly adapted for wind shields for automobiles. It is an object of the invention to provide a new and useful resilient weather strip formed integrally with the casing.

By forming the weather strip integrally with the outer surface of the casing I produce a resilient weather strip which gives under abnormal strains and returns to its normal position after the strain is released, so as to afford at all times a tight joint or connection between the casing and the frame in which it is mounted. Moreover, it possesses sufficient resilience to accommodate itself to the inequalities of the parts with which it cooperates, so as to provide a tight joint throughout its entire length. It has the further advantage of being easily and cheaply manufactured and entirely eliminates the use of solder, welding or rivets. It provides the further advantage of strengthening and reinforcing the casing.

The above and other features of novelty, advantages and capabilities will become apparent from a detail description of the accompanying drawings, in which I have illustrated one form of my invention applied to casings for wind shields, but the construction there shown is to be understood as illustrative only and not as defining the limits of my invention.

Figure 2:
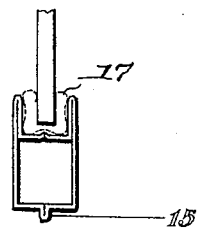
Fig. 2 is a vertical cross sectional view of the same.
Figure 1:
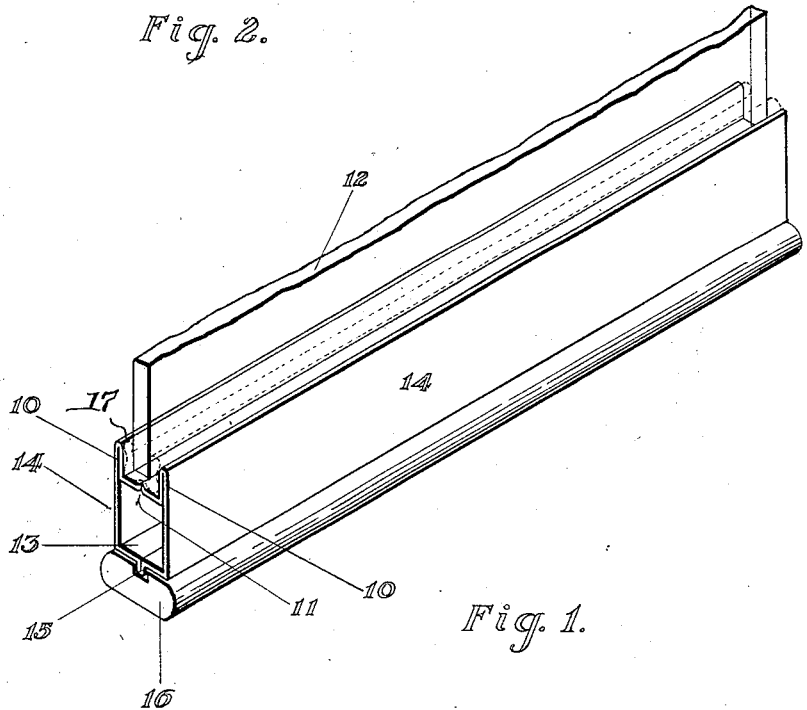
Fig. 1 is a perspective view of a section of the bottom portion of a wind shield casing embodying my invention showing it applied.

Referring to the drawings in detail, the casing is constructed of one piece of sheet metal having a hollow body portion with folded glass engaging flanges 10, the free ends of which flanges are bent inwardly at right angles to the glass engaging flanges into engagement with each other to form the support 11 for the glass 12, the longitudinal edges of which portions are welded together. Between the glass 12 and the glass-engaging flanges 10 may be interposed a cushioning member or setting 17, preferably of metal or other suitable resilient material.

The bottom 13 of the casing, which is formed integrally with the sides 14, is provided with an integral resilient weather strip 15 formed by folding the metal upon itself at substantially right angles to the bottom. From this it will readily be seen that the entire casing, including the weather strip is made of one piece of metal and possesses to the fullest extent the various advantages hereinbefore pointed out for it. The weather strip 15 is designed to cooperate with a groove in or a shoulder on the frame 16 in which the casing is mounted and to at all times afford a tight connection. In the embodiment illustrated I have shown it cooperating with a groove in the frame 16.

While I have only shown the invention as applied to the bottom portion of the shield or casing, it can be utilized equally as well at the sides or top, but, of course, there will not be the same necessity for having it at the sides and top as at the bottom.

I claim:

1. A wind shield casing for automobiles, comprising a single strip of metal having an integral resilient weatherstrip along its longitudinal central axis, formed by bending the strip, and having its edges bent upwardly, then inwardly and downwardly close to the upwardly bent portions of the strip, and then bent laterally in a single plane to meet substantially in a plane passing through the aforesaid axis, there being formed in said casing by said bending a wide groove adapted to receive the edge of the glass of the wind shield and a cushioning member, the latter adapted to separate the glass from the casing.

2. A wind shield casing for automobiles comprising a metal casing provided with a longitudinally disposed portion bent back upon itself to provide a resilient weather strip, the metal forming said casing being extended laterally in opposite directions to form a bottom, said metal being also extended vertically to form sides, the metal at the top edge of each side being bent back upon itself to form glass engaging flanges, the extremities of said flanges being bent toward each other at approximate right angles to the sides, said extremities meeting to form a glass support.

3. An automobile wind shield casing formed of a single piece of sheet metal having a longitudinally folded resilient weather-strip portion extending along its longitudinal median line below the plane of the bottom thereof, and integral side members folded over at their top edges and bent inwardly to provide glass-engaging portions.

4. An automobile wind shield casing formed from integral sheet metal and comprising side portions, glass-holding flange portions and a resilient weather-strip formed with integral folded portions having laterally extended portions integral with said side portions, whereby the weather-strip has sufficient resilience to accommodate itself to the inequalities of the parts with which it co-operates and to provide a tight joint throughout the length thereof.

In witness whereof, I hereunto subscribe my name to this specification in the presence of two witnesses.

FRANCIS J. PLYM.

Witnesses:
JEAN LOUIS RULO,
F. K. BARBER.